United States Patent [19]

Keller

[11] Patent Number: 4,665,714
[45] Date of Patent: May 19, 1987

[54] APPARATUS FOR COOLING THE CHARGING AIR OF A SUPERCHARGED INTERNAL COMBUSTION ENGINE

[75] Inventor: Jakob Keller, Killwangen, Switzerland

[73] Assignee: BBC Brown, Boveri & Company, Limited, Baden, Switzerland

[21] Appl. No.: 743,908

[22] Filed: Jun. 12, 1985

[30] Foreign Application Priority Data

Jul. 18, 1984 [CH] Switzerland ............ 3489/84

[51] Int. Cl.⁴ .............................................. F25D 9/00
[52] U.S. Cl. .................................... 62/401; 123/563
[58] Field of Search ............... 62/401, 86; 123/563; 60/599

[56] References Cited

U.S. PATENT DOCUMENTS 2,441,279 5/1948 McCollum ................. 62/401 X
3,049,891 8/1962 Barkelew .................. 62/401 X

FOREIGN PATENT DOCUMENTS 482104 4/1952 Canada ........................ 62/401
1530560 1/1970 Fed. Rep. of Germany ........ 62/401

Primary Examiner—Michael Koczo
Attorney, Agent, or Firm—Oblon, Fisher, Spivak, McClelland & Maier

[57] ABSTRACT

An apparatus for cooling the charging air of a supercharged internal combustion engine wherein a part of the charging air delivered by the charger is branched off and is accelerated to supersonic velocity in a Laval nozzle. With the accelerated air, surrounding air is sucked in according to the principle of a jet pump. The mixture which forms flows through the heat exchanger, in which it takes up heat from the charging air flowing around the tubes, and thereafter is discharged to the surroundings.

2 Claims, 2 Drawing Figures

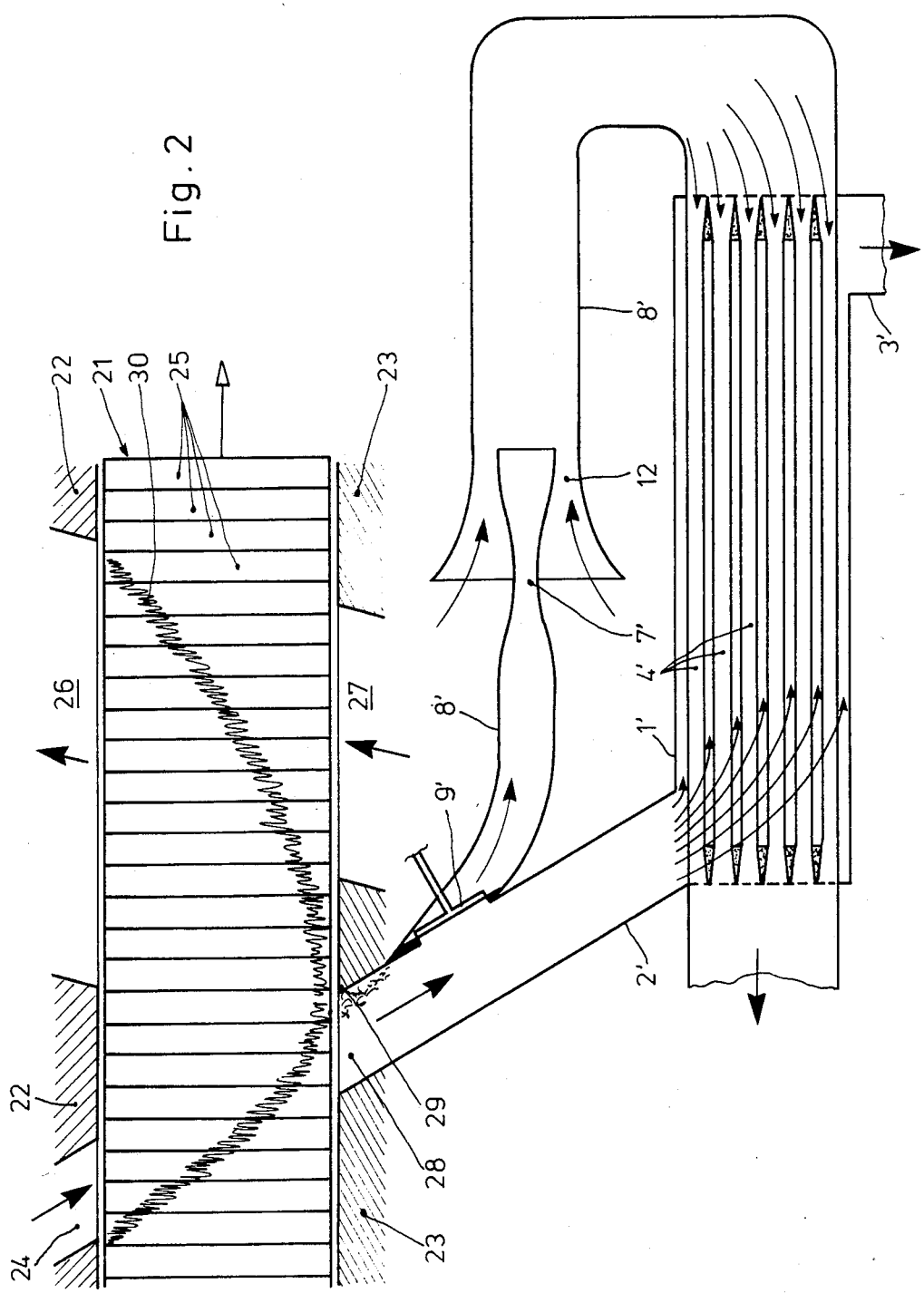

APPARATUS FOR COOLING THE CHARGING AIR OF A SUPERCHARGED INTERNAL COMBUSTION ENGINE

FIELD OF THE INVENTION

The invention relates to a method for cooling the charging air of supercharged internal combustion engines. Additionally, the invention relates to a charging air cooler for performing the method.

BACKGROUND OF THE INVENTION

In the employment of turbo-chargers or other supercharging devices (for example, gas-dynamic pressure wave machines) for compression of the air conveyed to an engine, in general a determined maximum charging pressure must not be exceeded. In order to avoid a pressure excess, often a so-called "waste gate" is employed. A waste gate is a valve through which high pressure exhaust gas is blown off as soon as the maximum permissible charging pressure is reached. In a pressure wave machine (for the functioning of which reference is made to Swiss Pat. No. 378,595 or to the publication CH-T 123,143 of the assignee) the employment of a waste gate is not totally free of problems. For instance, if too much exhaust gas is blown off, the exhaust gas still carried to the charger is no longer sufficient to ensure a complete scavenging in the low pressure scavenging period. In this case a part of the exhaust gas is again compressed, and of this a part again arrives in the charging air channel. This has the consequence that the charging air temperature is undesirably high and that the intake capacity of the engine is impaired in the range of higher revolutions.

ADVANTAGES OF THE INVENTION

Here the invention will provide a remedy. The invention solves both the problem of the recirculating exhaust gas and also the problem of too high a charging air temperature.

The particular advantage of the invention is to be seen in the fact that the usual blow-off valve can be dispensed with.

BRIEF DESCRIPTION OF THE DRAWINGS

In the drawing two examples of embodiments of the subject of the invention are shown schematically. Components which are not important for the invention are omitted (for example, the internal combustion engine itself and the charging apparatus). The direction of flow of the media is shown with arrows.

FIG. 2 shows a second embodiment of the invention particularly suited for use in gas-dynamic pressure wave machines.

DETAILED DESCRIPTION OF THE PRESENTLY PREFERRED EMBODIMENTS

Figure 1:
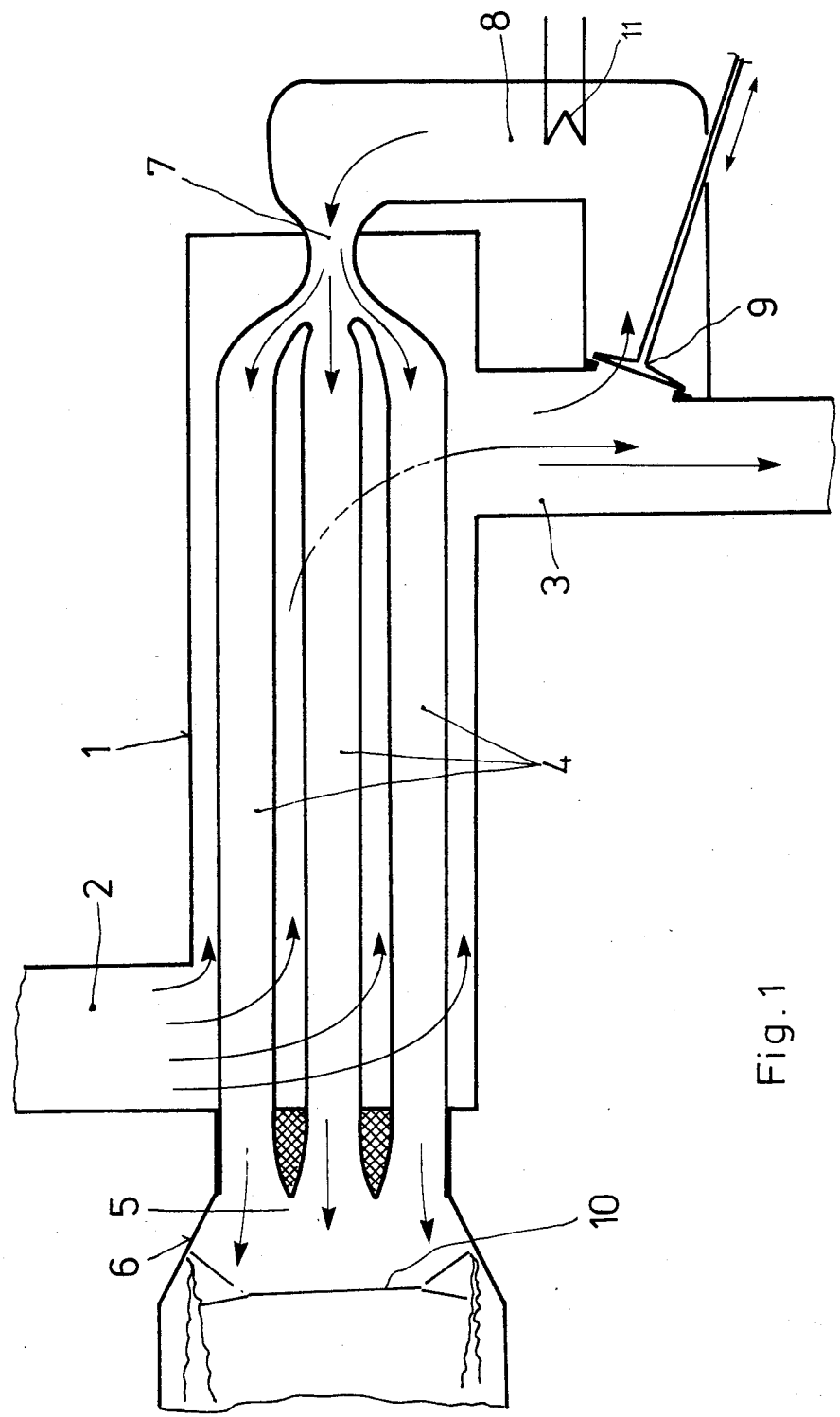
FIG. 1 shows a first embodiment of the invention.

In the variant according to FIG. 1, the housing 1 of a charging air cooler is provided with an inlet connection 2 and an outlet connection 3 for the charging air. In the interior of the housing, a number of tubes 4 are arranged, which are flowed through internally by cooling air and which are flowed round externally by the charging air. Preferably the countercurrent principle is chosen, it being understood that other kinds of flow are also possible. The tubes 4 open at their outlet ends into a common chamber 5 which is arranged at one of the ends of the housing 1. The fastening of the tubes 4 (for example, in a tube plate) is not shown. On the other hand, the streamlined shape of the ends of the tubes 4 is shown schematically. The chamber 5 makes a transition downstream into an abrupt cross sectional enlargement 6, the function of which will be explained later.

At their inlet sides the tubes 4 are connected with a Laval nozzle 7. For this purpose the entry part at the tube ends is correspondingly shaped. The cross section of all the tubes 4 flowed through is so dimensioned that supersonic speed is maintained in the tubes. Upstream of the Laval nozzle 7 there is arranged a branch passage 8 (the so-called "waste gate") which in the present case branches from the outlet connection 3. Of course the waste gate could just as well branch off from the inlet connection 2. Shown schematically is the shut-off device 9—usually controlled by the medium.

During the running of the engine, the following occurs: As soon as the charging air attains the maximum pressure predetermined by the engine, the shut-off device 9, controlled by a pressure regulator (not shown), opens, and a part of the charging air flows as cooling air into the branch passage 8. In the Laval nozzle 7 this air is accelerated to high supersonic speed and at the same time is expanded to a pressure which is substantially lower than atmospheric pressure. The expanding air thereby cools down very strongly. This now very cold air, which is flowing at supersonic velocity, is conveyed to the individual heat exchanger tubes. In these tubes the cold expanded air takes up heat, which has been given up to the cold tube walls by the charging air surrounding the tubes. As soon as the expanded exhaust air has passed through the heat exchanger tubes, it passes via the chamber 5 into the cross-sectional enlargement 6, in which it is compressed by a shock wave 10 to at least atmospheric pressure, and thereupon is conveyed to the exhaust, not shown.

Let the mode of operation of the invention be explained with reference to a numerical example. It is to be understood that the figures mentioned can only be approximate values, because altogether too numerous parameters influence both the configuration of the cooler and also its mode of operation.

If the pressure of the compressed air after the charging air cooler amounts to about 2 bar and its temperature is 80° C., then the branched-off cooling air can without difficulty be accelerated by the Laval nozzle 7 to twice the speed of sound. Then the air temperature at the entry to the heat exchanger tubes amounts to about −75° C. In this case the strength of the shock wave after the heat exchanger tubes is sufficient to compress the exhaust air back to more than 1 bar and to discharge it through the exhaust system. With laminar boundary layers, the recovery temperature at the start of the heat exchanger tubes amounts to about 55° C. One should accordingly expect a cooling effect in the order of magnitude of 10°–20° C.

Of course the invention is not limited to what is described as the first variant. Thus a cooling coil 11 could with advantage be arranged in the branch passage 8, in which the branched-off air is pre-cooled before its acceleration in the Laval nozzle 7. The heat given up in the cooling coil 11 could be discharged to the surroundings or taken for other purposes. The effect attainable for the charging air could on the basis of this measure be substantially further improved. In this case high Mach numbers in the heat exchanger tubes are also of advantage, because at high Mach numbers an especially great amount of heat is transferred per unit area of surface.

In FIG. 2 a variant is shown. This variant is particularly suited for solving the recirculation problem in gasdynamic pressure wave machines.

The fundamental construction of such a pressure wave machine and its exact structure can be gathered from the publication already mentioned, CH-T 123,143. In FIG. 2 the pressure wave machine is shown as a development of a cylindrical section at half the height of the cells, through the rotor and through the adjacent parts of the side members of the housing. For simplicity's sake it is shown as a single cycle machine, which expresses itself in that the gas housing 22 and the air housing 23 on their sides towards the rotor 21 are each provided with only one high pressure and one low pressure port. In order to explain the function of the system more clearly, the directions of flow of the working media and the direction of rotation of the pressure wave machine are indicated by arrows.

The hot exhaust gases of the internal combustion engine, not shown, pass through the high pressure gas inflow channel 24 into the rotor 21 provided with cells 25 which are axially straight and open at both ends. The hot exhaust gases expand in the rotor 21, and leave it via the low pressure gas outflow channel 26 into the exhaust (not shown). On the air side, atmospheric fresh air is sucked in, flows via the low pressure air inlet channel 27 axially into the rotor 21, is compressed therein, and leaves the rotor 21 as charging air via the high pressure air outlet channel 28 and via the charging air cooler to the engine.

For understanding of the actual, very complex gasdynamic pressure wave process, which is not the subject of the invention, reference is made to the already-mentioned publication CH-T 123,143. The running of the process necessary for understanding of the invention is explained briefly below: the band of cells consisting of the cells 25 is the development of a cylindrical section of the rotor 21 which, upon rotation of the rotor 21, moves in the direction of the arrow towards the right. The pressure wave processes occur in the interior of the rotor 21, and have substantially the effect that a gas-filled space and an air-filled space are formed. In the first space, the exhaust gas expands, and then passes away into the low pressure gas outflow channel 26. In the second space, a part of the sucked-in fresh air is compressed and driven out into the high pressure air outlet channel 28. The remaining part of the fresh air overflow through the rotor 21 into the low pressure gas outflow channel 26, and thus effects complete outflow of the exhaust gases. This scavenging is essential for the running of the process and must be maintained under all circumstances. In all cases one should avoid exhaust gas remaining in the rotor 21 and in a subsequent cycle being carried into the engine with the charging air.

According to the layout of the machine and operating conditions, recirculation of a defined quantity of exhaust gas can meanwhile take place, and can even be desired on grounds of protection of the environment. This is achieved when a certain fraction of the gas passes over onto the air side and overflows into the high pressure outflow channel 28 in the region of the closing edge 29. This state of affairs is shown in the block diagrams by the dividing front 30 between air and gas. This dividing front is not a sharp boundary, but rather a relatively wide mixing zone. The charging air, strongly contaminated in this way with exhaust gas, would cause an undesired raising of the charging air temperature with the consequence that the intake ability of the internal combustion engine in the higher range of reductions could be impaired.

With reference to the cooler acted on by the charging air, the same components in FIG. 2 are indicated with the same reference numerals as in FIG. 1 with addition of (').

The branch passage 8' is advantageously so arranged that, in the main, charging air with a strong component of exhaust gas is removed for cooling purposes. For this purpose it branches from the inlet connection 2' (for simplicity's sake the passage leading from the pressure wave machine to the charging air cooler is described by this term) on that side on which lies the closing edge 29.

After the expulsion through the pressure-controlled shut-off device 9', the hot air is accelerated to supersonic velocity in the Laval nozzle 7'. In dimensioning the expansion passage 9', care should be taken that the enlargement after the Laval nozzle 7' is so dimensioned that the static pressure lies distinctly below the surrounding pressure. With the accelerated air, surrounding air is now sucked in by a jet pump 12 and accelerated. The resulting relatively cold mixture flows through the thin tubes 4' of the heat exchanger in which it takes up heat from the engine combustion air which is directed in countercurrent around the tubes 4'. The mixture is discharged into the atmosphere via the exhaust, not shown.

Obviously, numerous modifications and variations of the present invention are possible in light of the above teachings. It is therefore to be understood that, within the scope of the appended claims, the invention may be practiced otherwise than as specifically described herein.

What is claimed is:

1. Apparatus for cooling the charging air of a supercharged internal combustion engine, said apparatus comprising:
   (a) a housing having an inlet connection and an outlet connection;
   (b) a heat exchanger disposed in said housing and having an inlet and an outlet;
   (c) fluid conduit means for withdrawing a part of the charging air and delivering it to the inlet of said heat exchanger, said fluid conduit means being in fluid communication with the inlet connection of said housing; and
   (d) a Laval nozzle disposed in a jet pump located in said fluid conduit means, said jet pump being in communication with surrounding air and serving to draw surrounding air into said heat exchanger, said Laval nozzle being sized, shaped, and positioned so that, during use of the apparatus, said Laval nozzle accelerates the part of the charging air passing therethrough to supersonic velocity.

2. Apparatus as recited in claim 1 wherein the main part of the charging air and the part of the charging air passing through said heat exchanger flow in counter current.

* * * * *